March 23, 1954  A. F. LONGENBACH  2,672,805
JOINTER DEVICE FOR PLOWS
Filed May 5, 1953  2 Sheets-Sheet 1
Fig. 1.
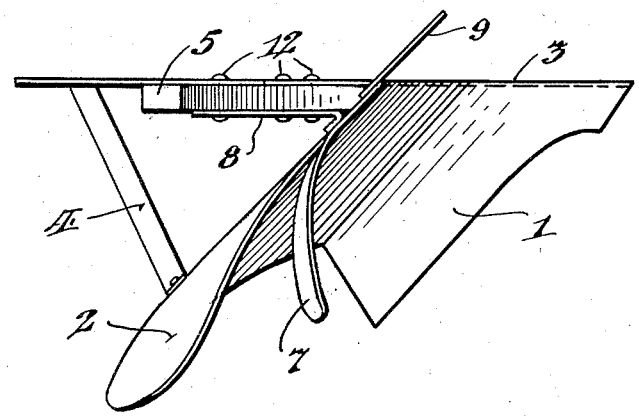
Fig. 2.
Fig. 4.
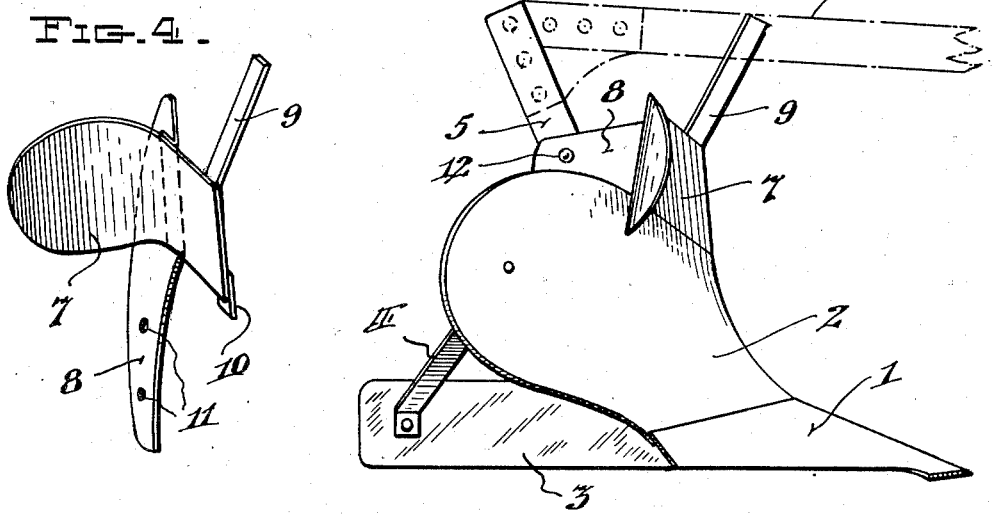
Fig. 3.
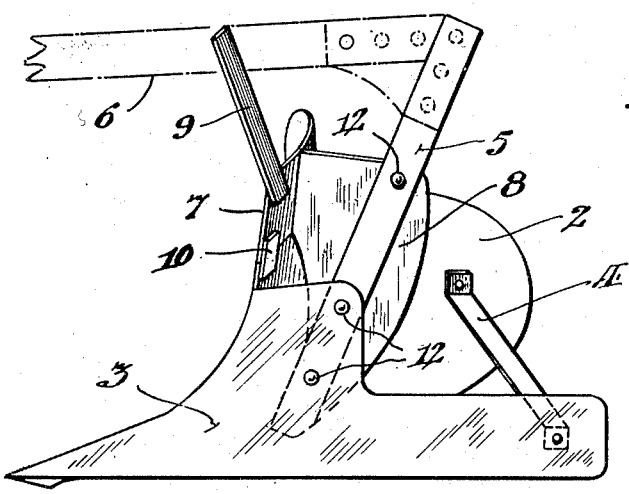
INVENTOR.
Arthur F. Longenbach,
BY
Alfred E. Ischinger
ATTORNEY.

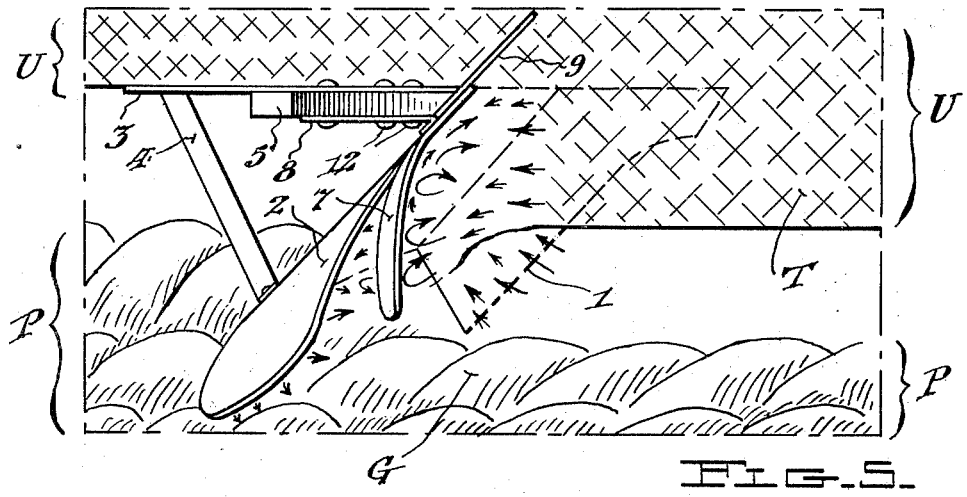
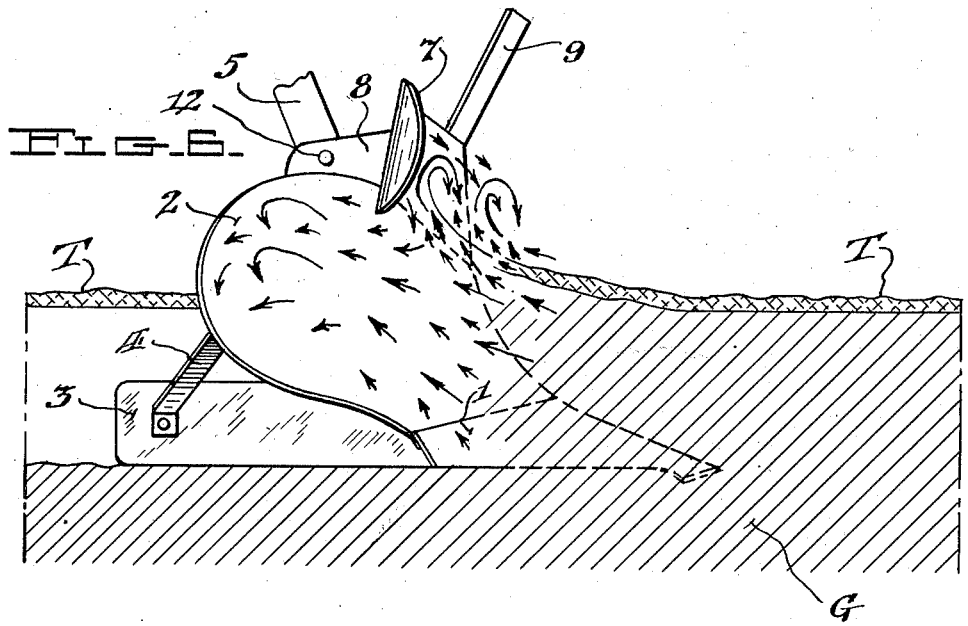
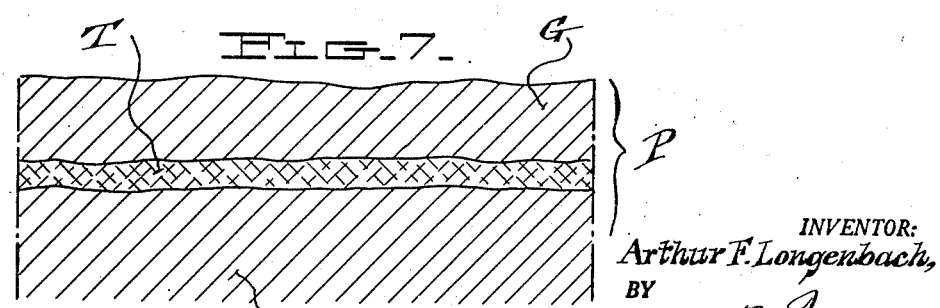

Patented Mar. 23, 1954

2,672,805

UNITED STATES PATENT OFFICE 2,672,805

JOINTER DEVICE FOR PLOWS

Arthur F. Longenbach, Northampton, Pa.

Application May 5, 1953, Serial No. 353,146

1 Claim. (Cl. 97—211)

This invention relates to plows and more particularly to plows having a jointer structure or device combined therewith.

The plow and jointer combination arrangements heretofore devised and utilized have all been more or less unsatisfactory from a practical standpoint for various reasons. For example, all such arrangements are more or less ineffective or inefficient in that they fail to completely plow under the so-called "trash" that normally accumulates on the surface of a field between the plowing periods, in the form of corn stalks, sticks, stones, branches, etc. Such unsatisfactory operation of the prior art arrangements not only causes a plowed field to have an undesirable and unsightly spotty appearance where the trash still remains above or projects from the surface of the plowed ground, but such trash spots also bring about operational difficulties, troublesome conditions and interference in connection with the later use of other agricultural equipment, such as a harrow, seeder, planter, etc.

One object of my invention is to provide a novel plow and jointer structure which overcomes the indicated and other unsatisfactory and detrimental conditions prevailing in connection with the use of the similar prior art structures.

Another object is to provide such a plow and jointer arrangement which has certain structural and functional features of advantage over the similar arrangements of the prior art.

A further object is to provide a novel jointer device for a plow, which can be either provided as a separate attachment for a plow, or combined with a plow so as to form an integral and permanent part thereof.

Another object is to provide such a jointer device which can be readily combined with a modern standard or conventional plow of the type presently available.

It is also an object to provide such a jointer device having novel guard means adapted to prevent trash from passing over the top edge of the device.

Another feature of my invention resides in the provision of such a jointer device which is of a simple and rugged construction and so formed that it can be quickly and easily combined with a standard plow to effectively and efficiently carry out its intended purpose.

An additional object is to provide such a jointer device which is constructed, arranged and shaped to function in novel manner, so as to cooperate with a plow in effecting complete disposition of the surface trash on a field beneath a layer of ground, during the plowing process.

With these and other objects in view, which will become more apparent from the following detailed description of one practical and illustrative form of my novel improvements shown in the accompanying drawings, my invention comprises the novel plow and jointer structure, jointer device, elements, features of construction and arrangement of parts in cooperative relationship, as more particularly defined by the hereto appended claim.

In the drawings:

Figure 1 is a top plan view of a combination plow and jointer structure in accordance with my invention.

Fig. 2 is a side elevational view of the structure shown in Fig. 1, with the main plow beam indicated in dot-and-dash lines.

Fig. 3 is a side elevational view, similar to Fig. 2, but showing the plow and jointer structure as it appears from the side opposite to that shown in Fig. 2.

Fig. 4 is a front perspective view of the novel jointer device forming part of my invention.

Fig. 5 is a top plan view of a field portion and indicates, more or less schematically, how the plow and jointer structure of my invention performs its plowing operation.

Fig. 6 is an elevational sectional view of the field portion shown in Fig. 5 and indicates further the operational performance of my plow and jointer structure, and, Fig. 7 is an elevational sectional view of the field portion, which indicates the relative location of the trash and ground after the field portion has been plowed with my novel plow and jointer structure.

It will be helpful to an understanding of my invention to first briefly consider some of the more important aspects and phases thereof. Accordingly, it is noted that the jointer device of my invention is particularly designed for cooperative combination with a modern standard or conventional plow of the type available and in use at the present time. When the jointer device is combined with such a plow in proper manner, as herein disclosed, the resultant plow structure is capable of operating in novel manner to effectively and efficiently plow under the previously referred to trash which normally accumulates on the surface of a field between the plowing periods. During my many years of practical experience in operating plows, I have been aware of an existent demand for a plow structure capable of accomplishing this desirable result and to my knowledge the problems involved in providing such a plow structure have not heretofore been solved.

The successful accomplishment of the said result with my plow structure improvements is attributed to the novel manner in which the plow activated ground moving upwardly adjacent the leading edge of the plow proper, is directed by the jointer device of my invention so that the combined trash and ground layer moving upwardly is first deposited in upside down manner, with the ground component on top, on the surface of the ground thereafter thrown over sidewise, or laterally, by the plowboard. Such operation of the plow structure assures continuous deposit of all trash at a substantial depth below the surface, as the plowing proceeds, and a finished plowed field of uniform appearance, unmarred by any trash spots.

Referring now to the drawings, in which similar reference characters designate corresponding parts, I have illustrated in Figs. 1, 2 and 3, a standard or conventional plow which generally comprises such well known parts as a plowshare 1, a moldboard 2, a landslide 3, a reinforcing and spacing member 4 and an upwardly extending plow connecting shank member 5, the upper portion of which is adapted to be riveted or otherwise secured to the main beam unit partly indicated by the dot-and-dash lines 6. The main beam unit 6, as usual, forms part of the vehicle or other structure that is drawn forwardly by horses, or a tractor, as the case may be.

The novel jointer device of my invention is shown by itself in Fig. 4 and comprises, a deflector plate or member 7, a supporting plate 8, a guard element 9 and an aligning element 10, all of which parts are formed of the same general type metal as the plow parts, such as iron, steel, etc., so as to assure that said jointer device parts have substantially the same strength rigidity and wearing quality as the plow parts. The parts of the jointer device are preferably attached to each other by welding in the relationship as shown, but it will be understood that they may be otherwise secured together in practical manner, if desired, as by riveting, etc.

As shown in Figs. 1, 3 and 4, the supporting plate 8 and the deflector plate 7 are arranged in angular relationship with respect to each other and in such manner that the force or thrust of the ground and trash impinging against the deflector plate 7 will be resisted substantially edgewise by the supporting plate 8.

The jointer device of my invention is adapted to be either separably, or permanently secured to the upwardly extending connecting shank 5. For this purpose, a plurality of apertures 11 are provided in the supporting plate 8, as shown, so that either screw bolts may be used for separable attachment of the supporting plate 8 with the shank 5, or rivets 12 as indicated, to effect a permanent connection.

From Figs. 5, 6 and 7, the novel operation of my plow structure will become apparent. In said figures, an unplowed field portion is schematically represented and generally indicated by the letter U and a plowed portion of the same field is similarly represented and generally indicated by the letter P. The trash which normally accumulate on an unplowed field between the plowing periods, in the form of corn stalks, sticks, stones, branches, etc., is schematically represented by the crossed-line hatching T, whereas the ground G of the field is indicated by the curved lines in Fig. 5 and the plain section lines in Figs. 6 and 7.

From Figs. 5 and 6 it will be noted that, as the plow structure moves forward, the trash T and ground G are simultaneously caused to move upwardly by the action of plowshare 1 and moldboard 2 of the plow proper, so that a combined portion of the trash T and ground G will impinge against the curved deflector plate 7 and will be turned upside down by the latter on top of the ground thrown over sidewise by the upper part of the moldboard, as the plow structure continues to move forward.

In the event that trash in the form of one or more sticks, branches, corn stalks, etc., tends to move upwardly beyond the top edge of the deflector plate 7, it will be caught and stopped by the guard bar 9 and will sooner or later fall forwardly into the trench or furrow created by the plow structure and covered with the ground being thrown thereover by the indicated action of the deflector plate 7 of the jointer device and the moldboard 2.

Fig. 7 schematically indicates the cross-sectional appearance of a field portion after it has been plowed with the plow structure of my invention. As indicated in this figure, the trash is "sandwiched" somewhere between the ground line or depth line along which the bottom of plow structure moves and the ground that is thrown over the trash by the action of the jointer device and moldboard as previously indicated.

When securing the jointer device to the plow as shown, either separably with bolts, or permanently with rivets, the positioning of the jointer device in proper relation to the moldboard is facilitated by the aligning element 10 which is attached adjacent to the lower edge of the deflector plate 7 so as to overlap with a rear top surface portion of the moldboard 2. By bringing the said element 10 in abutting relation with the moldboard 2, as shown, the front edge of the jointer device will form a continuous edge extension of the front cutting edge of the plow.

Of course, the plow structure improvements specifically shown and described can be changed and modified in various ways without departing from the invention herein disclosed and more particularly defined by the hereto appended claim.

I claim:

A jointer device of the character described comprising, a curved deflector member having a front edge adapted to form a direct continuation of the front cutting edge of a plow, an element on said member for effecting alignment of its front edge with the front cutting edge of the plow, a straight flat guard element on said member arranged to extend edgewise upwardly from the front edge of said member, and a flat plate extending downwardly from said member and adapted to be attached to the plow.

ARTHUR F. LONGENBACH.

References Cited in the file of this patent

UNITED STATES PATENTS

| Number | Name | Date |
|---|---|---|
| 200,861 | Gale | Mar. 5, 1878 |
| 234,251 | Currier | Nov. 9, 1880 |
| 338,481 | Casaday | Mar. 23, 1886 |
| 571,138 | Pearson | Nov. 10, 1896 |
| 833,789 | Machai | Oct. 23, 1906 |